United States Patent
Karl

(10) Patent No.: US 7,182,129 B2
(45) Date of Patent: Feb. 27, 2007

(54) DEVICE FOR HEATING AND/OR AIR-CONDITIONING THE PASSENGER COMPARTMENT OF A MOTOR VEHICLE

(75) Inventor: Stefan Karl, Bazemont (FR)

(73) Assignee: Valeo Climatisation, La Verriere (FR)

( * ) Notice: Subject to any disclaimer, the term of this patent is extended or adjusted under 35 U.S.C. 154(b) by 189 days.

(21) Appl. No.: 09/802,982

(22) Filed: Mar. 12, 2001

(65) Prior Publication Data

US 2001/0020529 A1    Sep. 13, 2001

(30) Foreign Application Priority Data

Mar. 10, 2000    (FR) .................................. 00 03125

(51) Int. Cl.
 F25B 29/00    (2006.01)
 B60H 1/00    (2006.01)
 B60H 3/00    (2006.01)
 B60H 1/22    (2006.01)

(52) U.S. Cl. ................. 165/202; 237/2 B; 237/12.3 B; 237/12.3 R; 62/196.4; 62/238.6; 62/238.7; 62/323.1

(58) Field of Classification Search ................ 237/2 B, 237/12.3 B, 12.3 R; 62/196.4, 238.6, 238.7, 62/323.1; 165/42, 43

See application file for complete search history.

(56) References Cited

U.S. PATENT DOCUMENTS

| | | | | |
|---|---|---|---|---|
| 3,910,345 A | * | 10/1975 | Whalen | ........................ 165/50 |
| 4,616,484 A | * | 10/1986 | Mehdi et al. | ............... 62/238.6 |
| 4,949,553 A | * | 8/1990 | Suzuki | ........................ 62/238.7 |
| 5,291,941 A | * | 3/1994 | Enomoto et al. | ........... 237/2 B |
| 5,641,016 A | * | 6/1997 | Isaji et al. | .................. 62/238.6 |
| 5,971,290 A | | 10/1999 | Echigoya et al. | |
| 6,047,770 A | * | 4/2000 | Suzuki et al. | ................ 165/202 |

FOREIGN PATENT DOCUMENTS

| | | | | |
|---|---|---|---|---|
| DE | 19813674 | | 4/1999 | |
| DE | 19806654 | | 8/1999 | |
| FR | 2288278 A | * | 6/1976 | |
| FR | 2621867 | | 4/1989 | |
| JP | 0024134 | * | 2/1984 | ................ 62/238.6 |
| JP | 62013944 A | * | 1/1987 | |
| JP | 63207709 A | * | 8/1988 | |
| JP | 6-143974 | * | 5/1994 | |
| JP | 6-262934 | * | 9/1994 | ................ 237/2 B |
| JP | 6-262935 | * | 9/1994 | ................ 237/2 B |
| JP | 6-262936 | * | 9/1994 | ................ 237/2 B |
| JP | 08086517 A | * | 4/1996 | |
| JP | 10-76837 | * | 3/1998 | |
| JP | 11034640 A | * | 2/1999 | |

\* cited by examiner

*Primary Examiner*—John K. Ford
(74) *Attorney, Agent, or Firm*—Berenato, White & Stavis

(57) ABSTRACT

A device for air-conditioning a motor vehicle has an engine-cooling loop, a heat-pump loop containing a compressor, an evaporator as cold source of the heat pump and a condenser as hot source of the heat pump. The condenser is integrated into the engine-cooling loop upstream of the air heater. An air-conditioning branch has a condenser and an evaporator with an upstream end connected to the heat-pump loop downstream of the compressor, and a downstream end connected to the heat-pump loop upstream of the compressor. Switching means make it possible to make the refrigerant fluid circulate either in the heat-pump loop, or in the heat-pump branch, in such a way as to form a heat-pump loop.

10 Claims, 3 Drawing Sheets

DEVICE FOR HEATING AND/OR AIR-CONDITIONING THE PASSENGER COMPARTMENT OF A MOTOR VEHICLE

FIELD OF THE INVENTION

The invention relates to a device for heating and/or air-conditioning the passenger compartment of a motor vehicle including a main heating loop and a top-up heating loop.

BACKGROUND OF THE INVENTION

Such devices are known, and comprise an engine-cooling loop in which a heat-carrying fluid circulates which takes up heat from the engine and which gives it back to an air heater, a heat-pump loop in which a refrigerant fluid circulates, this loop containing a compressor, an evaporator constituting a cold source of the heat pump at which the refrigerant fluid takes up heat from the surroundings, and a condenser constituting a hot source of the heat pump at which the refrigerant fluid gives up heat, the condenser being integrated into the engine-cooling loop upstream of the air heater.

In motor vehicles, whether they are internal-combustion-engine, electric or other vehicles, the main heating of the passenger compartment is carried out by means of an engine-cooling loop which takes up heat from the engine and transfers it to a heat exchanger, called air heater, swept by an airflow which is directed into the passenger compartment.

However, it can happen that this heating proves to be insufficient, for example if the outside temperature is particularly low. This comes about, more particularly, when the vehicle is equipped with a modern, high-efficiency engine in which the thermal losses are low, which does not allow a sufficient quantity of heat to be extracted from it.

It is for this reason that it is known to equip motor vehicles with supplementary heating, which makes it possible to contribute supplementary heating to the passenger compartment in situations in which the main heating proves to be insufficient.

Auxiliary-heating boilers are known, which are integrated into the cooling circuit upstream of the air heater. This makes it possible to increase the temperature of the engine-cooling liquid upstream of the air heater, and consequently the temperature of the airflow delivered by the latter. The drawback of such a device is that the temperature of the cooling liquid is also increased upstream of the engine. Consequently, the quantity of heat extracted from the engine reduces. This reduction has to be compensated for by the boiler, which reduces the quantity of additional heat available for heating the passenger compartment. The energy efficiency of such a device is therefore hardly satisfactory.

The Japanese document JP 10-76837 (Calsonic) describes a device for heating the passenger compartment of a motor vehicle including a cooling circuit with which is associated a supplementary-heating circuit which forms a heat pump, by virtue of which heat is taken up at a cold source by evaporation of a fluid in an evaporator, and this heat is transferred to a hot source by condensation of the same fluid in a condenser. A heat exchanger constituting the cold source of the heat pump is integrated into the cooling circuit upstream of the engine, and a heat exchanger constituting the hot source of the heat pump is integrated into this same circuit upstream of the air heater. The refrigerant fluid of the heat-pump loop gives up heat to the heat-carrying fluid upstream of the air heater.

In such a device, the temperature of the heat-carrying fluid of the cooling circuit is not increased at the inlet to the engine. In contrast, it is lowered by the take-up of heat at the cold source of the heat pump. That being so, the quantity of heat extracted from the engine is not reduced, but increased. The energy efficiency of the top-up heating is markedly enhanced by comparison with a device such as the one which was described previously.

However, this device exhibits several drawbacks. On the one hand, it does not allow cooling of the passenger compartment in the case of a high outside temperature. Moreover, the heat taken up from the cooling circuit, in heating the refrigerant fluid of the heat pump, can lead to an inadmissible intake pressure for the compressor, which can lead to it being destroyed.

The object of the invention is especially to remedy these drawbacks. It proposes a heating and/or air-conditioning device which makes it possible to cool the passenger compartment in the event of high outside heat. Moreover, this device makes it possible to control the pressure of the fluid in the heat-pump loop at the inlet to the compressor.

SUMMARY OF THE INVENTION

To that end, the device of the invention includes a device for heating and/or air conditioning the passenger compartment of a motor vehicle, comprising an engine-cooling loop in which a heat-carrying fluid circulates for taking up heat from the engine and returning the heat to an air heater; a heat-pump loop in which a refrigerant fluid circulates, this loop containing a compressor, an evaporator constituting a cold source of the heat pump at which the refrigerant fluid takes up heat from the surroundings, and a condenser constituting a hot source of the heat pump at which the refrigerant fluid gives up heat, the condenser being integrated into the engine-cooling loop upstream of the air heater, the device further comprising an air-conditioning branch containing a condenser and an evaporator, the air-conditioning branch an upstream end connected to the heat-pump loop downstream of the compressor, and a downstream end connected to the heat-pump loop upstream of the compressor, and a switching device making it possible to make the refrigerant fluid circulate either in the air-conditioning loop, or in the heat-pump branch, is such a way as to form a heat-pump loop.

Thus, the device can function according to at least three different modes. In a first mode, corresponding to a moderate outside temperature, the engine-cooling loop operates alone. In a second mode, corresponding to a harsher outside temperature or to the starting of the vehicle, the engine-cooling loop and the heat-pump loop operate simultaneously. Finally, in a third mode, corresponding to a high outside temperature, only the air-conditioning loop operates.

In one particular embodiment, the evaporator is integrated into the cooling loop, upstream of the engine.

In another embodiment, the evaporator takes up heat from surroundings external to the engine-cooling circuit.

According to an important provision of the invention, the cooling loop includes control means, for example at least one valve, which make it possible to control the quantity of heat-carrying fluid which passes through the evaporator.

Likewise, the cooling loop includes control means, for example at least one valve, which make it possible to control the quantity of heat-carrying fluid which passes through the condenser.

The air-conditioning branch preferably includes a refrigerant-fluid accumulator. The evaporator advantageously constitutes a refrigerant-fluid accumulator common to the air-conditioning loop and to the heat-pump loop.

According to another embodiment, the heating device includes a modular casing containing the evaporator, the control means of the evaporator, the anti-return valve, the condenser, the control means of the condenser, the switching means and the pressure-reduction means of the heat-pump loop.

BRIEF DESCRIPTION OF THE DRAWINGS

Other characteristics and advantages of the present invention will emerge further on reading the description which follows of embodiment examples given by way of illustration by reference to the attached figures.

In the figures.

DESCRIPTION OF THE PREFERRED EMBODIMENTS

Figure 1:
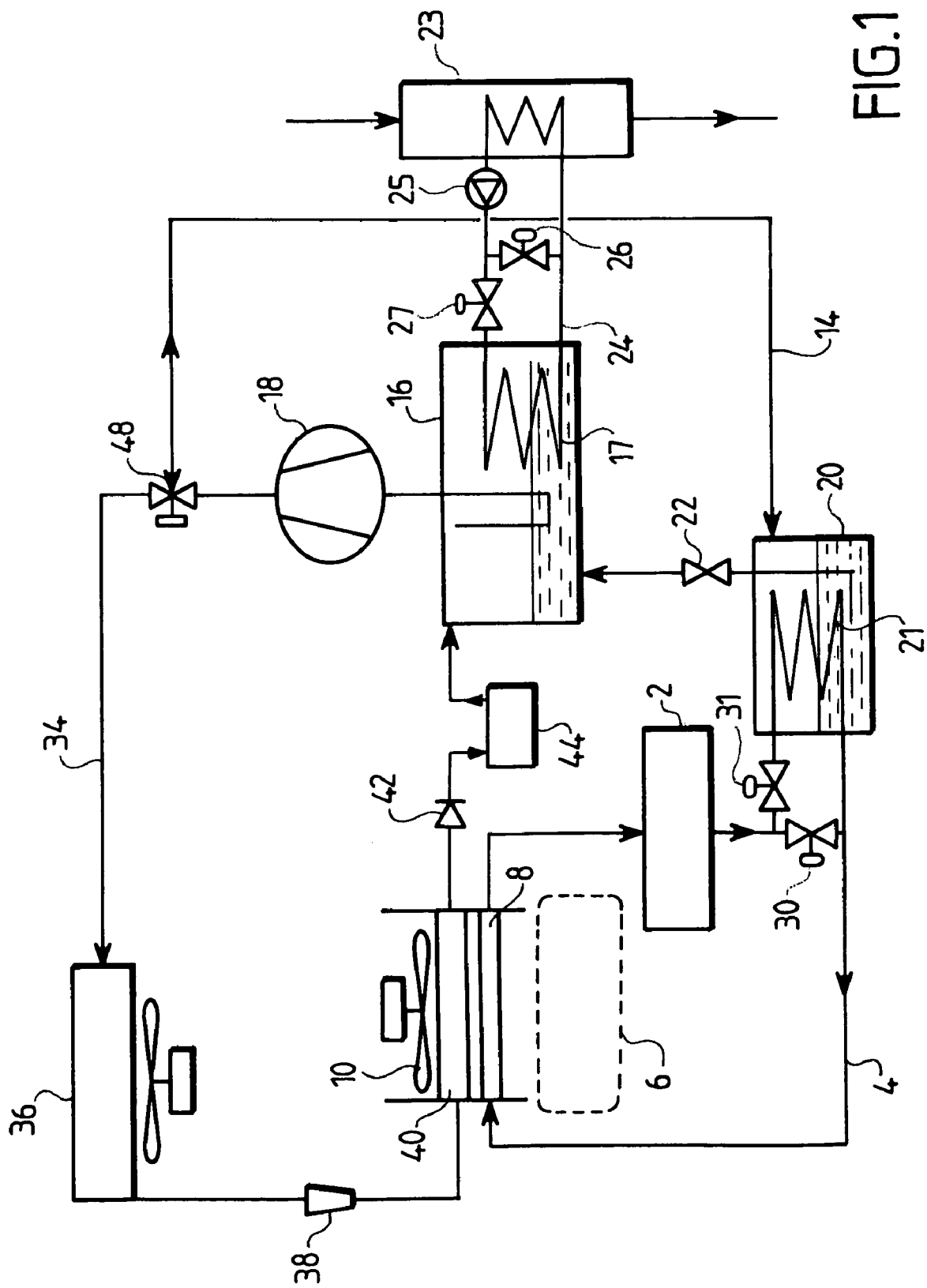
FIG. 1 is a diagrammatic view of a device according to a first embodiment.

In the various figures, like reference numerals indicate like parts.

A first embodiment of the invention has been represented in FIG. 1. A motor vehicle includes a motor 2. In this example, the motor 2 is an internal-combustion engine, but it could also be a motor of another type, such as an electric motor. Conventionally, the engine 2 is cooled by a cooling loop 4 which allows for the main heating of the passenger compartment 6 represented diagrammatically in dashed line. The cooling loop 4, in which a refrigerant fluid (in this example water containing glycol) circulates, contains a radiator or air heater 8 traversed by an airflow blown by a blower 10. This airflow heats up on passing through the air heater, which makes it possible to heat the passenger compartment 6.

Given that this heating may not be sufficient under certain circumstances, the device provides for a second loop, namely a heat-pump loop 14 which carries out supplementary heating of the glycol-containing water of the cooling loop 4. The heat-pump loop 14 successively comprises an evaporator 16, a compressor 18, a condenser 20 and pressure-reducing means 22 which are interposed between the condenser 20 and the evaporator 16. The evaporator 16 constitutes a cold source at which the heat-pump loop takes up heat from the surroundings.

In order to enhance the thermal efficiency of the heat pump, it is desirable for this exchange to take place at as high a temperature as possible. In the embodiment example represented, the evaporator 16 incorporates a heat exchanger 17 between the refrigerant fluid of the circuit of the loop 14 and a heat-carrying fluid which heats up in contact with an external source 23 such as the exhaust pipe or the oil circuit of the engine.

This fluid circulates in a loop 24 under the action of a pump 25. A valve 26, mounted in shunt mode on the loop 24, and more particularly on the heat exchanger 17, makes it possible to regulate the quantity of fluid which passes through the evaporator 16. The valve 26 may especially be a regulated valve or a thermostatic valve. Moreover, a valve 27 is placed between the valve 26 and the heat exchanger 17. This valve makes it possible completely to cut off the circulation of the fluid in the heat exchanger 17 of the evaporator 16. The valve 27 is open when the valve 26 is closed, and vice versa. In a variant, the valves 26 and 27 could be brought together into a three-way valve.

The compressor 18 may be a variable-displacement compressor in which control of the displacement is applied internally or externally.

The condenser 20 constitutes the hot source of the heat pump. It incorporates a heat exchanger 21 with the glycol-containing water of the engine-cooling loop 4. The condenser 20 is mounted just upstream of the air heater 8. The water of the cooling circuit 4 is heated up by passing through the condenser 20. It therefore enters the air heater at a higher temperature, which makes it possible to increase the temperature of the airflow blown into the passenger compartment 6 and thus to contribute supplementary heating as required.

In the same way as for the evaporator 16, a valve 30 is mounted in shunt mode on the loop 4 at the connections to the condenser 20, and thus to the heat exchanger 21, so as to regulate the quantity of heat-carrying fluid which passes through the condenser. Like the valve 26, the valve 30 may especially be a regulated valve or a thermostatic valve.

Moreover, a valve 31 is placed between the valve 30 and the heat exchanger 21. This valve makes it possible completely to cut off the circulation of the fluid in the heat exchanger 21 of the condenser 20. The valve 31 is open when the valve 30 is closed, and vice versa. In a variant, the valves 30 and 31 could be assembled together into a three-way valve.

The level of the intake pressure of the compressor 18 is very important for the operation of the heat pump. If too great a quantity of heat is applied to the evaporator 16, the intake pressure of the compressor 18 will increase, which could lead to operation at a pressure level incompatible with the strength characteristics of the compressor. The device of the invention makes it possible to regulate the intake pressure of the compressor 18 via the control of the fraction of the fluid which circulates respectively in the evaporator 16 and in the shunt controlled by the valve 26. By making a small quantity of fluid pass into the evaporator, the heat applied, and, consequently, the intake pressure of the compressor, are reduced. Conversely, by making a large quantity of fluid pass through the evaporator, the heat applied, and, consequently, the intake pressure of the compressor 18, are increased. The device of the invention therefore provides a simple and effective means for regulating the intake pressure of the compressor.

Likewise, if the heating power of the heat pump is too high, the throughput of fluid which circulates in the evaporator 16 is reduced by further opening the valve 26 until the intake pressure of the compressor reaches the level at which it starts to reduce its displacement by itself (internal control) or at which the displacement can be controlled from the outside (external control).

The valve 30 makes it possible to enhance the timing of the heat pump at low level of temperature of the water of the cooling loop 4. By opening the valve 30, the throughput of water in the water/high-pressure refrigerant exchanger constituting the condenser 20 is reduced. With the removal of heat being reduced at the hot source, the temperature of the latter increases and the condensation of the refrigerant takes place at a higher pressure, which further loads the compressor 18. The engine 2 then has to supply a greater effort, which makes it possible to inject more heat energy into the water circuit.

Finally, the heating and/or air-conditioning device of the invention includes an air-conditioning branch 34. This branch contains a condenser 36, pressure-reducing means 38, an evaporator 40, an anti-return valve 42 and a refrigerant-fluid accumulator 44. At its upstream end, the branch 34 is connected to the heat-pump loop 14 downstream of the compressor 18. At its downstream end, the branch 34 is connected to the heat-pump loop upstream of the compressor 18 and, more particularly, to the exchanger 16. The same refrigerant fluid circulates in the heat-pump circuit and in the branch 34. Switching means, for example a three-way valve 48, make it possible for the refrigerant fluid to circulate either in the loop 14 or in the branch 34. Thus two loops are formed, namely a heat-pump loop and an air-conditioning loop, which possess a common part in which a common compressor, in particular, is found.

The device can thus operate according to at least three different modes.

In a first operating mode, the cooling loop 4 is sufficient to provide the heating of the passenger compartment 6. In this case, the valve 30 is fully open in such a way that all the glycol-containing water circulates exclusively between the engine 2 and the air heater 8.

In a second operating mode, the cooling loop and the heat-pump loop 14 operate simultaneously. The three-way valve 48 is driven in such a way that the refrigerant fluid circulates in the heat-pump loop. The valves 26 and 30 are completely or partially closed. The refrigerant fluid of the heat-pump circuit takes up heat from the surroundings, for example from the exhaust pipe 22. This heat, increased by the mechanical energy of compression of the fluid, is given up to the glycol-containing water of the cooling circuit within the condenser 20. The glycol-containing water thus enters into the air heater at a higher temperature, which makes it possible to increase the temperature of the airflow blown into the passenger compartment 6 and thus to apply top-up heating.

In a third operating mode, corresponding to a high outside temperature, it is not necessary to heat the passenger compartment, but in contrast to cool it. In this third operating mode, only the air-conditioning loop is operating. The three-way valve 48 is driven in such a way that the refrigerant fluid circulates in the air-conditioning loop. The valves 26 and 30 are open. Thus, the air-conditioning loop makes it possible, conventionally, to send into the passenger compartment 6 an airflow set into motion by the blower 10, which is common to the branch 34 and to the branch 4, and cooled by passing through the evaporator 40.

Optionally, the valve 30 may be closed and the valve 31 open. The circulation of the water in the exchanger 21 of the condenser 20 has no impact on performance and makes it possible to purge the refrigerant fluid and to drive it towards the air-conditioning loop.

Figure 2:
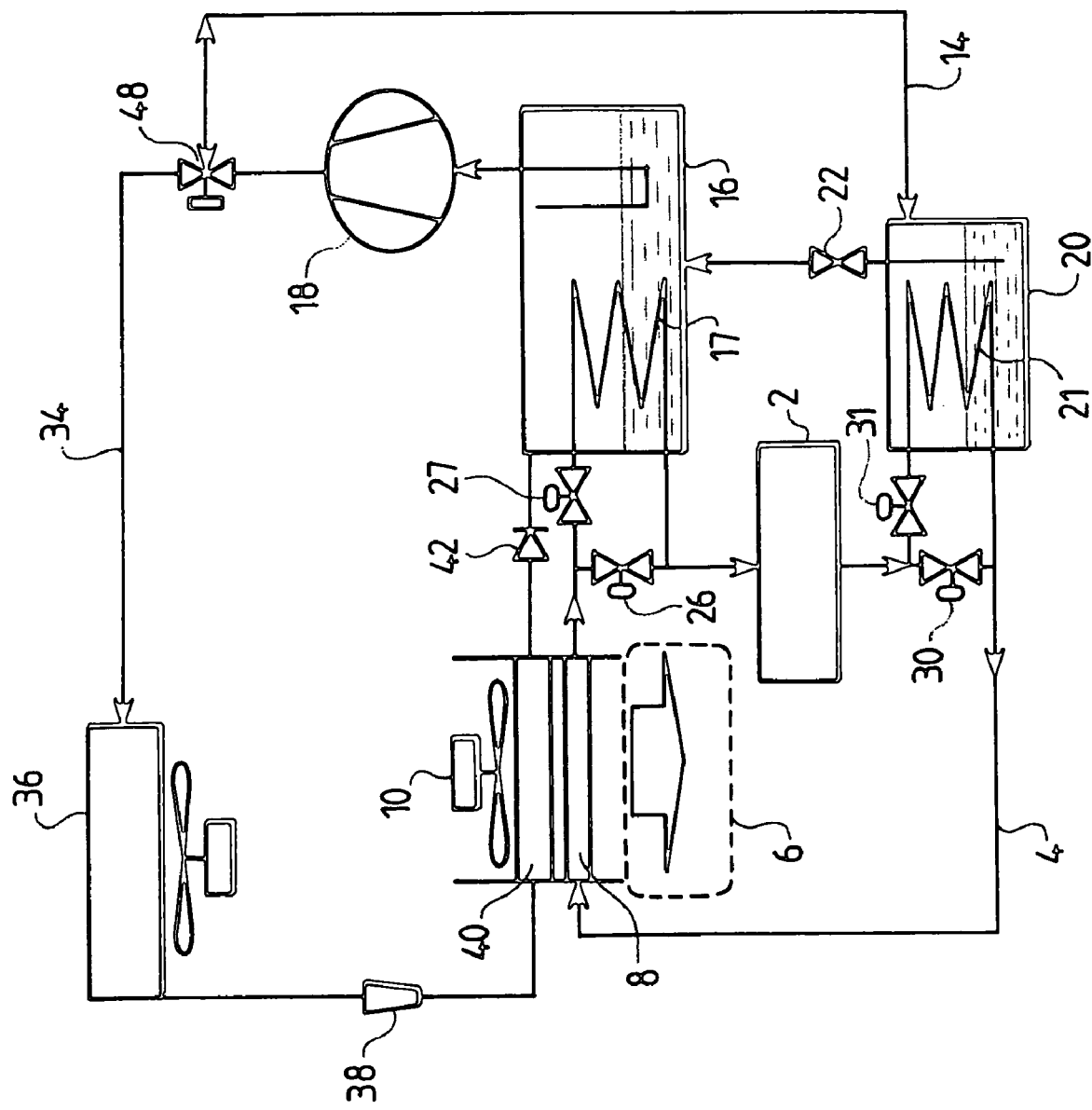
FIG. 2 is a diagrammatic view of a device according to a variant of the first embodiment.

A variant embodiment of the device of FIG. 1 has been represented in FIG. 2. This variant is distinguished by the fact that the cold source of the heat pump, namely the evaporator 16, takes up heat from the cooling loop 4 of the engine 2. To that end, the loop 4 passes through the evaporator 16 in such a way as to constitute a low-pressure heat exchanger between the fluid of the loop 4 and the refrigerant fluid of the heat-pump loop 14. A valve 26 is mounted in shunt mode at the connections to the evaporator 16, and a valve 27 is also provided, analogous to that of FIG. 1. In the embodiment of FIG. 1, the temperature of the water is increased at the outlet from the air heater, and consequently at the inlet to the engine. That leads to a reduction in the quantity of heat extracted from the engine.

By integrating the evaporator into the engine-cooling loop, downstream of the air heater 8, the water of the cooling circuit is cooled before penetrating into the engine, which makes it possible to increase the quantity of heat extracted from the engine. Another difference consists in the fact that the accumulator, separated in the embodiment of FIG. 1, is integrated into the evaporator 16. Thus a reserve of refrigerant fluid is constituted, common to the heat-pump loop and to the air-conditioning loop. The operation of the valves 26 and 27, as well as that of the valves 30 and 31, is identical to what was described by reference to FIG. 1. The valve 26 allows regulation of the intake pressure of the compressor 18, as well as the regulation of the power of the heat pump. The valve 30 makes it possible to facilitate priming of the heat pump at very low temperature. In the same way as in the embodiment of FIG. 1, the valves 27 and 31 are open when the valves 26 and 30 are closed, and vice versa.

Figure 3:
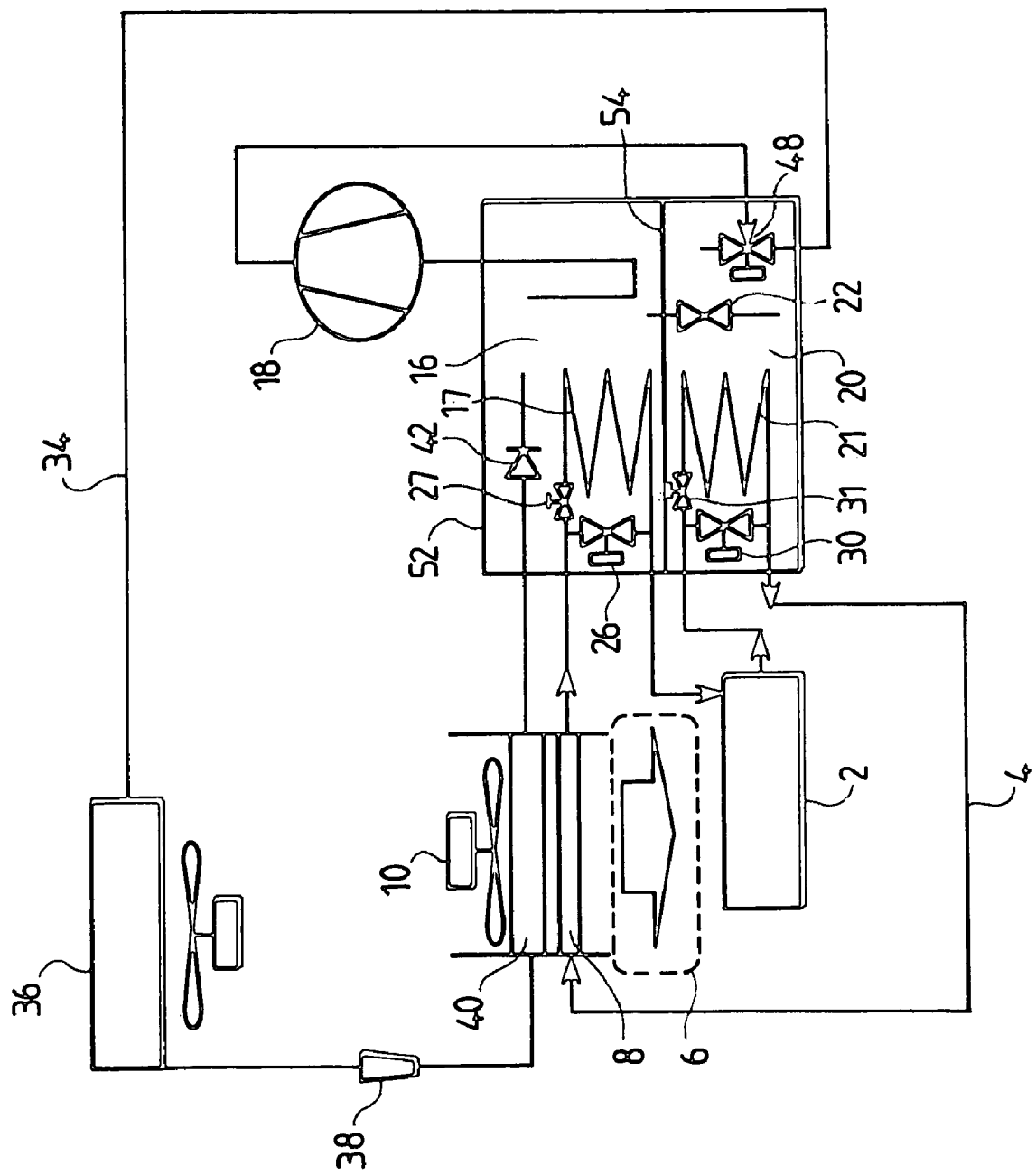
FIG. 3 represents a second embodiment of the invention in which the device is contained in a modular casing.

A second embodiment of the invention has been represented in FIG. 3, comprising a modular casing 52. The volume internal to the casing 52 is separated into two by an internal partition 54 which defines two chambers, namely, respectively, a chamber 16 which plays the role of evaporator and a chamber 20 which plays the role of condenser. After the air heater 8, the cooling loop 4 passes through the chamber 16 before coming back to the engine. At the outlet from the engine, the loop 4 passes through the condenser chamber 20. The valves 26 and 27 are housed within the chamber 16 and the valves 30 and 31 within the chamber 20. The anti-return valve 42 is contained in the chamber 16 and the three-way valve 48 in the chamber 20. When it passes from the condenser to the evaporator, the refrigerant fluid of the heat-pump loop passes through pressure-reducing means 22 integrated into one or other of the two chambers.

The modular casing 52 constitutes an assembly which contains all the elements necessary to produce the top-up heating circuit. To install it, it is sufficient to provide the necessary connections. The other elements of the heating device, in particular the condenser and the evaporator of the air-conditioning circuit, as well as the air heater, are conventional. They consequently do not require any modification.

What we claim is:

1. A device for heating and/or air conditioning the passenger compartment of a motor vehicle, comprising an engine-cooling loop in which a heat-carrying fluid circulates for taking up heat from the engine and returning the heat to an air heater; a heat-pump loop in which a refrigerant fluid circulates, said heat-pump loop containing a compressor, a first evaporator constituting a cold source of the heat pump at which the refrigerant fluid takes up heat from the surroundings, and a first condenser constituting a hot source of the heat pump at which the refrigerant fluid gives up heat, the first condenser being integrated into the engine-cooling loop upstream of the air heater, the device further comprising an air-conditioning branch containing a second condenser and a second evaporator, the air-conditioning branch having an upstream end connected to the heat-pump loop downstream of the compressor, and a downstream end connected to the heat-pump loop upstream of the compressor, and a switching device making it possible to make the refrigerant fluid circulate either in the air-conditioning branch, or in the heat-pump branch, is such a way as to form a heat-pump loop, and further comprising a modular casing containing the first evaporator, first valve system of the first evaporator for controlling the quantity of heat-carrying fluid which passes through the first evaporator an anti-return valve upstream of the evaporator, the first condenser, second valve system of the first condenser for controlling the quantity of heat-carrying fluid which passes through the first condenser, the switching device and a pressure-reduction means of the heat-pump loop for reducing the pressure of the refrigerant fluid between the first condenser and the first evaporator, wherein said first valve system is operatively connected with said second valve to control an intake pressure of said compressor.

2. A device for heating and/or air conditioning the passenger compartment of a motor vehicle, comprising an engine-cooling loop in which a heat-carrying fluid circulates for taking up heat from the engine and returning the heat to an air heater; a heat-pump loop in which a refrigerant fluid circulates, said heat-pump loop containing a compressor, a first evaporator constituting a cold source of the heat pump at which the refrigerant fluid takes up heat from the surroundings, and a first condenser constituting a hot source of the heat pump at which the refrigerant fluid gives up heat, the first condenser being integrated into the engine-cooling loop upstream of the air heater, the device further comprising an air-conditioning branch containing a second condenser and a second evaporator, the air-conditioning branch having an upstream end connected to the heat-pump loop downstream of the compressor, and a downstream end connected to the heat-pump loop upstream of the compressor, and a switching device making it possible to make the refrigerant fluid circulate either in the air-conditioning branch, or in the heat-pump branch, is such a way as to form a heat-pump loop wherein the device further comprises an evaporator heat regulating loop comprising a first valve system operatively connected to a heat source and fluidly connected to said first evaporator, said first valve system controlling the amount of heat transferred to said evaporator and thereby controlling an inlet pressure to said compressor.

3. The device of claim 2 wherein said heat source comprises one of an exhaust pipe or an oil circuit within said engine.

4. The device according to claim 2 wherein said first valve system is comprised of an evaporator valve and an evaporator bypass valve, said evaporator valve allowing an evaporator heating fluid to flow to said first evaporator and thereby transfer heat to said first evaporator, said evaporator bypass valve allowing fluid to bypass said first evaporator.

5. The device according to claim 2 further comprising a second valve system wherein said engine cooling loop is operatively connected to said first condenser by said second valve system when additional heating capacity is required, and operatively disconnected from said first condenser by said second valve system when no additional heating capacity is required.

6. The device according to claim 2 wherein said second valve system comprises a condenser valve and a condenser bypass valve, said condenser valve allowing fluid to flow to said first condenser and thereby transfer heat to said heat-carrying fluid in said engine cooling loop, said condenser bypass valve allowing fluid to bypass said condenser so that no heat is transferred from said first condenser to said heat carrying fluid.

7. The device according to claim 6 wherein said second valve system is adapted to control the loading of said compressor.

8. A device for heating and/or air conditioning the passenger compartment of a motor vehicle, comprising an engine-cooling loop in which a heat-carrying fluid circulates for taking up heat from the engine and returning the heat to an air heater; a heat-pump loop in which a refrigerant fluid circulates, said heat-pump loop containing a compressor, a first evaporator constituting a cold source of the heat pump at which the refrigerant fluid takes up heat from the surroundings, and a first condenser constituting a hot source of the heat pump at which the refrigerant fluid gives up heat, the first condenser being integrated into the engine-cooling loop upstream of the air heater, the device further comprising an air-conditioning branch containing a second condenser and a second evaporator, the air-conditioning branch having an upstream end connected to the heat-pump loop downstream of the compressor, and a downstream end connected to the heat-pump loop upstream of the compressor, and a switching device making it possible to make the refrigerant fluid circulate either in the air-conditioning branch, or in the heat-pump branch, is such a way as to form a heat-pump loop, said device further comprising a valve system operatively connecting said engine cooling loop to said first condenser when additional heating capacity is required, when no additional heating capacity is required said valve system operatively disconnects said first condenser from said engine cooling loop.

9. The device according to claim 8 wherein said valve system is comprised of a condenser valve and a condenser bypass valve, said condenser valve is connected to said engine cooling loop to allow said heat-carrying fluid to flow to said first condenser and thereby allow heat to be transferred to said heat-carrying fluid in said engine cooling loop, said condenser bypass valve is connected to said engine cooling loop to allow said heat-carrying fluid to bypass said condenser so that no heat is transferred from said first condenser to said heat-carrying fluid.

10. A device for heating and/or air conditioning the passenger compartment of a motor vehicle, comprising an engine-cooling loop in which a heat-carrying fluid circulates for taking up heat from the engine and returning the heat to an air heater; a heat-pump loop in which a refrigerant fluid circulates, said heat-pump loop containing a compressor, a first evaporator constituting a cold source of the heat pump at which the refrigerant fluid takes up heat from the surroundings, and a first condenser constituting a hot source of the heat pump at which the refrigerant fluid gives up heat, the first condenser being integrated into the engine-cooling loop upstream of the air heater, the device further comprising an air-conditioning branch containing a second condenser and a second evaporator, the air-conditioning branch having an upstream end connected to the heat-pump loop downstream of the compressor, and a downstream end connected to the heat-pump loop upstream of the compressor, and a switching device making it possible to make the refrigerant fluid circulate either in the air-conditioning branch, or in the heat-pump branch, is such a way as to form a heat-pump loop; wherein the cooling loop includes a first valve system to control the quantity of heat-carrying fluid which passes through the first condenser and the heat-pump loop includes a second valve system to control the quantity of heat-carrying fluid which passes through the first evaporator, wherein said first and second valve system systems control an intake pressure of said compressor.

* * * * *